United States Patent
Wang et al.

(10) Patent No.: US 7,606,318 B2
(45) Date of Patent: Oct. 20, 2009

(54) METHOD OF SPACE-TIME ENCODING AND DECODING FOR FREQUENCY SELECTIVE FADING CHANNEL

(75) Inventors: Yingmin Wang, Beijing (CN); Xiaolong Ran, Beijing (CN)

(73) Assignee: Da Tang Mobile Communications Equipment Co., Ltd., Beijing (CN)

( * ) Notice: Subject to any disclaimer, the term of this patent is extended or adjusted under 35 U.S.C. 154(b) by 610 days.

(21) Appl. No.: 10/518,426

(22) PCT Filed: Jun. 2, 2003

(86) PCT No.: PCT/CN03/00425

§ 371 (c)(1),
(2), (4) Date: Aug. 22, 2005

(87) PCT Pub. No.: WO04/002036

PCT Pub. Date: Dec. 31, 2003

(65) Prior Publication Data

US 2006/0072680 A1  Apr. 6, 2006

(30) Foreign Application Priority Data

Jun. 20, 2002  (CN) ............................... 02 1 21410

(51) Int. Cl.
*H04B 7/02* (2006.01)

(52) U.S. Cl. .................. 375/267; 375/316; 375/340; 375/346; 375/347

(58) Field of Classification Search .................. 375/204, 375/208, 229, 260, 264, 265, 284, 299, 346, 375/347, 267

See application file for complete search history.

(56) References Cited

U.S. PATENT DOCUMENTS 6,185,258 B1 * 2/2001 Alamouti et al. ............ 375/260

(Continued)

FOREIGN PATENT DOCUMENTS

CN      1314750 A     9/2001

(Continued)

OTHER PUBLICATIONS

International Search Report of PCT/CN2003/00425, dated Oct. 9, 2003.

(Continued)

*Primary Examiner*—Mohammad H Ghayour
*Assistant Examiner*—Sophia Vlahos
(74) *Attorney, Agent, or Firm*—Christie, Parker & Hale, LLP

(57) ABSTRACT

The invention discloses a space-time encoding and decoding method for a frequency selective fading channel, comprising: an encoder takes two independent data fields of a time slot in input data as a processing unit with space-time orthogonal encoding method, encodes them and generates two data vectors, thereby forming two diversity signals, and transmitting said two diversity signals simultaneously with each through one diversity antenna; a receiving terminal neglects mutual interference between said two diversity signals caused by non-orthogonality; the terminal performing joint detection only taking into account affect to said two diversity signals from multipath interference and multi-user interference, thereby obtaining a decoding result; and implementing interference counteraction based on result of joint diction to remove interference between the two diversity signals, and then returning to the previous step to implement iteration for decoding processing. The number of iteration times can be predefined. The invention takes an independent data field as a processing unit for encoding and decoding, and the decoding takes an iteration method based on joint detection and interference counteraction. This invention provides a simple and effective way for space-time encoding and decoding for a frequency selective fading channel.

12 Claims, 2 Drawing Sheets

U.S. PATENT DOCUMENTS

| | | | |
|---|---|---|---|
| 6,356,605 B1 | 3/2002 | Hosur et al. | |
| 6,549,585 B2 * | 4/2003 | Naguib et al. | 375/267 |
| 6,775,260 B1 * | 8/2004 | Dabak et al. | 370/342 |
| 6,865,373 B2 * | 3/2005 | Tong et al. | 455/63.1 |
| 6,898,248 B1 * | 5/2005 | Elgamal et al. | 375/259 |
| 6,959,047 B1 * | 10/2005 | Al-Dhahir et al. | 375/267 |
| 7,154,964 B1 * | 12/2006 | Al-Dhahir et al. | 375/260 |
| 7,181,244 B2 * | 2/2007 | Judson et al. | 455/562.1 |
| 7,215,718 B1 * | 5/2007 | Calderbank et al. | 375/299 |
| 7,221,645 B2 * | 5/2007 | Wang et al. | 370/203 |
| 7,272,192 B2 * | 9/2007 | Lindskog et al. | 375/264 |
| 2002/0003774 A1 | 1/2002 | Wang et al. | |
| 2004/0052315 A1 * | 3/2004 | Thielecke et al. | 375/299 |

FOREIGN PATENT DOCUMENTS

| | | |
|---|---|---|
| CN | 1331528 A | 1/2002 |
| EP | 1006676 A | 6/2000 |
| KR | 2002025468 A | 4/2002 |

OTHER PUBLICATIONS

Wu, et al., "MMSE Receiver with Space-time Coding for Downlink WCDMA System," Journal of Circuits and System, vol. 5, No. 4, Dec. 2004 (On Order).

* cited by examiner

METHOD OF SPACE-TIME ENCODING AND DECODING FOR FREQUENCY SELECTIVE FADING CHANNEL

CROSS-REFERENCE TO RELATED APPLICATION

This application is a National Phase Patent Application of International Application Number PCT/CN2003/00425, filed on Jun. 2, 2003, which claims priority of Chinese Patent Application Number 02121410.7, filed on Jun. 20, 2002.

FIELD OF THE TECHNOLOGY

The invention relates to mobile communication technology, more particularly to a method of space-time encoding and decoding for a frequency selective fading channel.

BACKGROUND OF THE INVENTION

Space-time encoding is one of the important methods that can raise performance of a wireless communication system effectively. There are two branches of the space-time encoding, one is layered space-time encoding and the other is space-time encoding based on transmitting diversity. The space-time encoding based on transmitting diversity can be further divided into two kinds: space-time block encoding and space-time trellis encoding.

Along with the development of high-speed wireless communication technology, the signal transmission bandwidth and rate is increased continuously, which means that time for transmitting a data symbol is shorter and shorter. Therefore, time delay spread of a wireless transmission channel cannot be neglected, that is, the channel frequency selective fading is getting worse.

The prior space-time encoding and decoding schemes are designed based on a flat fading channel. When the schemes are used for a frequency selective fading channel, the performance becomes worse obviously, and it is too complex to implement when improving performance of the algorithm.

In a multi-user frequency selective fading channel, since Inter-Symbol Interference (ISI) and Multiple Access Interference (MAI) exist at the same time, implementation of space-time encoding and decoding has great difficulty. Some effective methods for counteracting ISI and MAI on a frequency selective channel, such as equalization, joint detection method etc., become very complex or even failure if space-time encoding is involved therein.

In the 3rd Generation Partnership Project—Time Division Duplex (3GPP-TDD) system, the prior space-time encoding and decoding scheme used for a multi-user frequency selective fading channel only performs space-time encoding for the basic common control channel, but in the 3rd Generation Partnership Project—Frequency Division Duplex (3GPP-FDD) system, space-time encoding is employed for most channels. The 3GPP-TDD space-time encoding scheme first takes a symbol as an encoding and decoding unit, later it takes a half of symbols of a data field as an encoding and decoding unit. Since these schemes have many changes that bring more complex compared with the schemes in which space-time encoding is not employed, the space-time transmission diversity (STTD) scheme is discarded in 3GPP-TDD v4.3 and space code transmission diversity (SCTD) scheme is applied. Although the reception processing procedure is simplified with the SCTD, more channel resource is occupied and more channels are employed; it is difficult to be applied to other kinds of channels, and also it is impossible to be applied on the multipath diversity situation.

There is a space-time encoding and decoding scheme that transforms high-speed data to multiple parallel low-speed data and transmits them on multiple channels, but really this is a space-time—orthogonal frequency division multiplexing (ST-OFDM) method that would thoroughly change the signal structure and system on the physical layer, so it is greatly limited in practical use.

In summary, the space-time encoding and decoding method is important to improve performance of a wireless communication system. Usually, a symbol or a string of symbols are used as a processing unit for encoding and decoding, but under the condition of a frequency selective fading channel, improvement of performance is limited by the calculation complexity.

SUMMARY OF THE INVENTION

An object of the invention is to design a space-time encoding and decoding method that is suitable to the frequency selective fading channel to obtain better performance with small amount of calculation complexity.

A space-time encoding and decoding method for a frequency selective fading channel according to the present invention comprises:

A. an encoder taking two independent data fields of a time slot in input data as a processing unit with space-time orthogonal encoding method, encoding them and generating two data vectors, thereby forming two diversity signals, and transmitting said two diversity signals simultaneously with each through one diversity antenna;

B. a terminal receiving said two diversity signals, and neglecting mutual interference between said two diversity signals caused by non-orthogonality;

C. said terminal performing joint detection only taking into account affect to said two diversity signals from multipath interference and multi-user interference, thereby obtaining a decoding result; and D. implementing interference counteraction based on result of joint diction to remove interference between two diversity signals, and then returning to step C to implement iteration for decoding processing.

Two diversity signals in step A may be transmitted through two diversity beams of one smart antenna respectively and simultaneously.

The method may further comprise the step of predefining number of iteration times to determine execution times from step C to step D and from step D to step C again.

The method of the invention is a new space-time encoding and decoding method that is suitable to a frequency selective fading channel. The method takes an independent data field as a processing unit, and the decoding applies an iteration method based on joint detection and interference counteraction. When making joint detection, only affect to diversity signal from multipath interference and multi-user interference is taken into account, and then interference counteraction is implemented based on the joint detection result to remove interference between diversity signals.

With the space-time encoding and decoding scheme proposed in the invention, good performance can be reached with small amount of computation complexity in a frequency selective fading channel. The invention provides a simple and effective solution for space-time encoding and decoding on a frequency selective fading channel.

DETAILED DESCRIPTION OF THE INVENTION

The invention will be described in more detail hereinafter with reference to the accompanying drawings.

In a frequency selective fading channel, the ISI exists between neighbor symbols. Therefore, in a general space-time encoding method, there is not only interference between diversity signals, but also interference between neighbor encoding units and interference between neighbor encoding blocks. If the interference were neglected, the communication performance would be worse; and if the interference were considered, the calculation complexity would be increased greatly.

An independent data block is taken as the processing unit in the encoding and decoding method according to the present invention, so the interference between neighbor encoding units and neighbor encoding blocks does not exist, which simplifies the signal detection and decoding processing. This processing method is similar or compatible to the processing methods in which space-time encoding processing is not employed to a great extent. Many processing schemes for counteracting ISI and MAI can be used in the space-time encoding situation with small amount of change.

Figure 1:
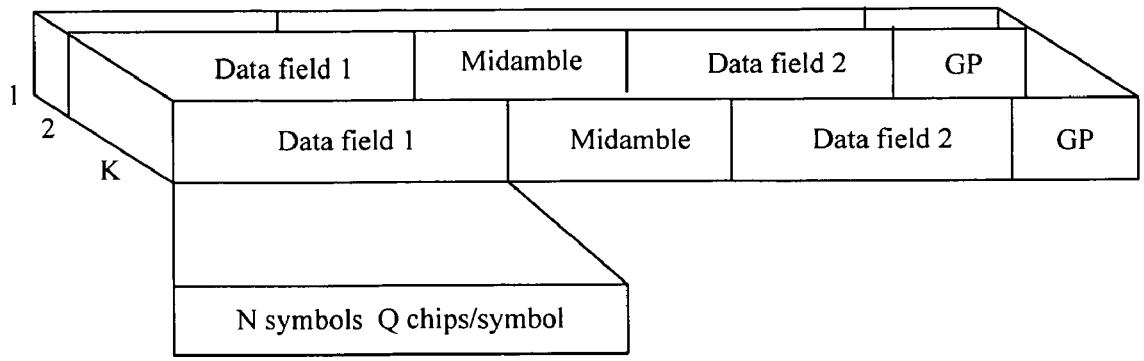
FIG. 1 is a schematic diagram illustrating a data structure for time-slot CDMA burst data.

FIG. 1 shows data structure of a time-slot CDMA burst data in the 3GPP-TDD system. It can be seen from FIG. 1 that in parallel K burst data of a multi-user or multi-channel, each time-slot includes two data fields (or referred as data blocks): DATA FIELD 1 and DATA FIELD 2, and there is a midamble between these two data fields. So these two data fields are independent and there is no mutual interference between them. The end of a time slot is a guard period (GP). Every data field has N symbols, and every symbol is consisted of Q chips.

In this invention, an independent data field is used as a processing unit for encoding, and at the receiving end the decoding also takes a data field as a processing unit. It is simple when this method is used in double diversity (theoretically it can be used in the multiple diversity, but the complexity is increased and therefore it is not practicable). Therefore, the encoding and decoding method according to the present invention can be employed with small amount of change for the signal structure and processing method. Furthermore, since the two data fields are independent, and there is no interference between them, the detection and decoding method can be simplified and improved, and better detection performance can be obtained with a small amount of calculation volume or a small quantity of iterative times.

Figure 2:
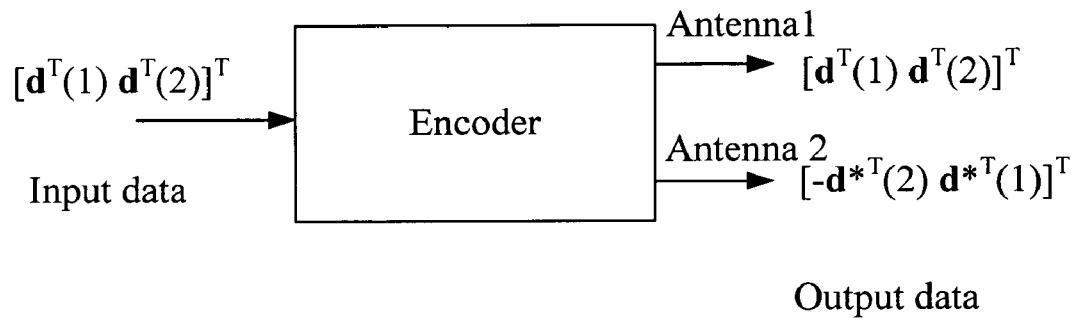
FIG. 2 shows the input and output of a space-time encoder when taking a data field as a processing unit.

FIG. 2 shows a space-time encoder 20 taking a data field as a processing unit. Input data of the encoder 20, i.e., information data vector d in a time slot, can be represented as $d=[d^T(1)d^T(2)]^T$; wherein $d(1)$ and $d(2)$ are two independent data fields, and in a 3GPP-TDD system they can be two data fields in one time slot; T denotes a transpose operation. The data which has been encoded by the encoder 20 is $[d^T(1)d^T(2)]^T$ and $[-d^{*T}(2)d^{*T}(1)]^T$, wherein * represents conjugate. The two generated data vectors can be transmitted simultaneously by two different conventional diversity antennas: diversity antenna 1 and diversity antenna 2, or by two different diversity beams of one smart antenna: smart antenna diversity beam 1 and smart antenna diversity beam 2. In other words, the diversity antenna 1 (or diversity beam 1) transmits data vector $[d^T(1)d^T(2)]^T$ and the diversity antenna 2 (or diversity beam 2) transmits data vector $[-d^{*T}(2)d^{*T}(1)]^T$ simultaneously, thereby the space-time encoding is realized. Specially, the input data $[d^T(1)d^T(2)]^T$ is encoded by conventional space-time diversity orthogonal encoding method, and two output data vectors: $[d^T(1)d^T(2)]^T$ and $[-d^{*T}(2)d^{*T}(1)]^T$ are obtained and transmitted via two diversity antennas simultaneously and respectively.

In the following, the detection and decoding method for space-time encoding mode which takes a data field as a processing unit will be described, i.e. the detection and decoding scheme corresponding to the designed data field encoding scheme will be described. Here, it is called the original detection and decoding method.

Data corresponding to a data field can be expressed as the formula (1):

$$d(i) = (d_1^{(I)}, \ldots, d_1^{(K)}, d_2^{(I)}, \ldots, d_2^{(K)}, \ldots, d_N^{(I)}, \ldots, d_N^{(K)})^T \quad (1)$$

Wherein i is 1, 2; K is the number of terminal users working simultaneously; N is the number of symbols in a user data field.

Suppose $r_1$ and $r_2$ represent the sample values of two data fields received at the terminal, and there is no interference between $r_1$ and $r_2$ even on a frequency selective fading channel. The $r_1$ and $r_2$ can be expressed as the formula (2):

$$\begin{cases} r_1 = A_1 d(1) - A_2 d^*(2) + n_1 \\ r_2 = A_2 d^*(1) - A_1 d(2) + n_2 \end{cases} \quad (2)$$

Wherein $n_i$ is the noise vector of the ith data field; $A_i$ is the system matrix of the signal transmission between the ith transmitting antenna and receiving antenna, and the system matrix is determined by the channel pulse response and the user transmission waveform. The formula (2) can be rewritten as formula (3):

$$r = A d_t + n \quad (3)$$

Wherein $r = [r_1^T, r_2^{*T}]^T$, $d_t = [d^T(1) d^{*T}(2)]^T$, $n = [n_1^T, n_2^{*T}]^T$, and $$A = \begin{bmatrix} A_1 & -A_2 \\ A_2^* & A_1^* \end{bmatrix} \quad (4)$$

From formula (4), it can be obtained that:

$$A^{*T}A = \begin{bmatrix} A_1^{*T}A_1 + (A_2^{*T}A_2)^* & (A_1^{*T}A_2)^T - A_1^{*T}A_2 \\ ((A_1^{*T}A_2)^T - A_1^{*T}A_2)^{*T} & (A_1^{*T}A_1 + (A_2^{*T}A_2)^*)^* \end{bmatrix} \quad (5)$$

The matrix A is not an orthogonal matrix under the condition of frequency selective fading channel, so the performance will become worse if a match filter is applied. In order to obtain better performance, the optimized linear joint detection scheme is provided. The continuously estimated value $\hat{d}_t$ of the receiving data $d_t$ is:

$$\hat{d}_t = (B)^{-1} A^{*T} r \quad (6)$$

Wherein $(B)^{-1}$ has the function of interference suppression (implement inverse operation for B); $A^{*T}r$ is the result of orthogonal match. The matrix B is shown in formula (7):

$$B = \begin{cases} I & MF \\ A^{*T}A & ZF-BLE \\ A^{*T}A + \sigma^2 I & MMSE-BLE \end{cases} \quad (7)$$

wherein $\sigma^2$ is the noise power, and I is an identity matrix. The formula (7) shows three solutions among which MF represents matched filter scheme, ZF-BLE represents zero-forcing block equalization scheme and MMSE-BLE represents the minimum mean-square-error block equalization scheme.

The dimension of matrix B is 2NK×2NK, so the calculation complexity of formula (6) is far greater than that under the situation of no space-time encoding. Therefore, the object of simplifying processing and reducing calculation volume proposed in the invention cannot be realized with the original joint detection algorithm.

Based on the above-mentioned design, the invention provides a simplified decoding procedure having a characteristic of a small amount of calculation volume.

The simplified algorithm is an iterative algorithm. It is divided into two steps. In the first step, only multi-path interference and multi-user interference to every diversity signal is taken into account, and the upper right block of the formula (5) $(A_1^{*T}A_2)^T - A_1^{*T}A_2)$ and the lower left block of the formula (5) $(((A_1^{*T}A_2)^T - A_1^{*T}A_2)^{*T})$ are set to null, then the equation (6) is calculated. In the second step, interference is counteracted with the result of the first step to remove interference between diversity signals. The procedure can be done by multiple iterations.

Figure 3:
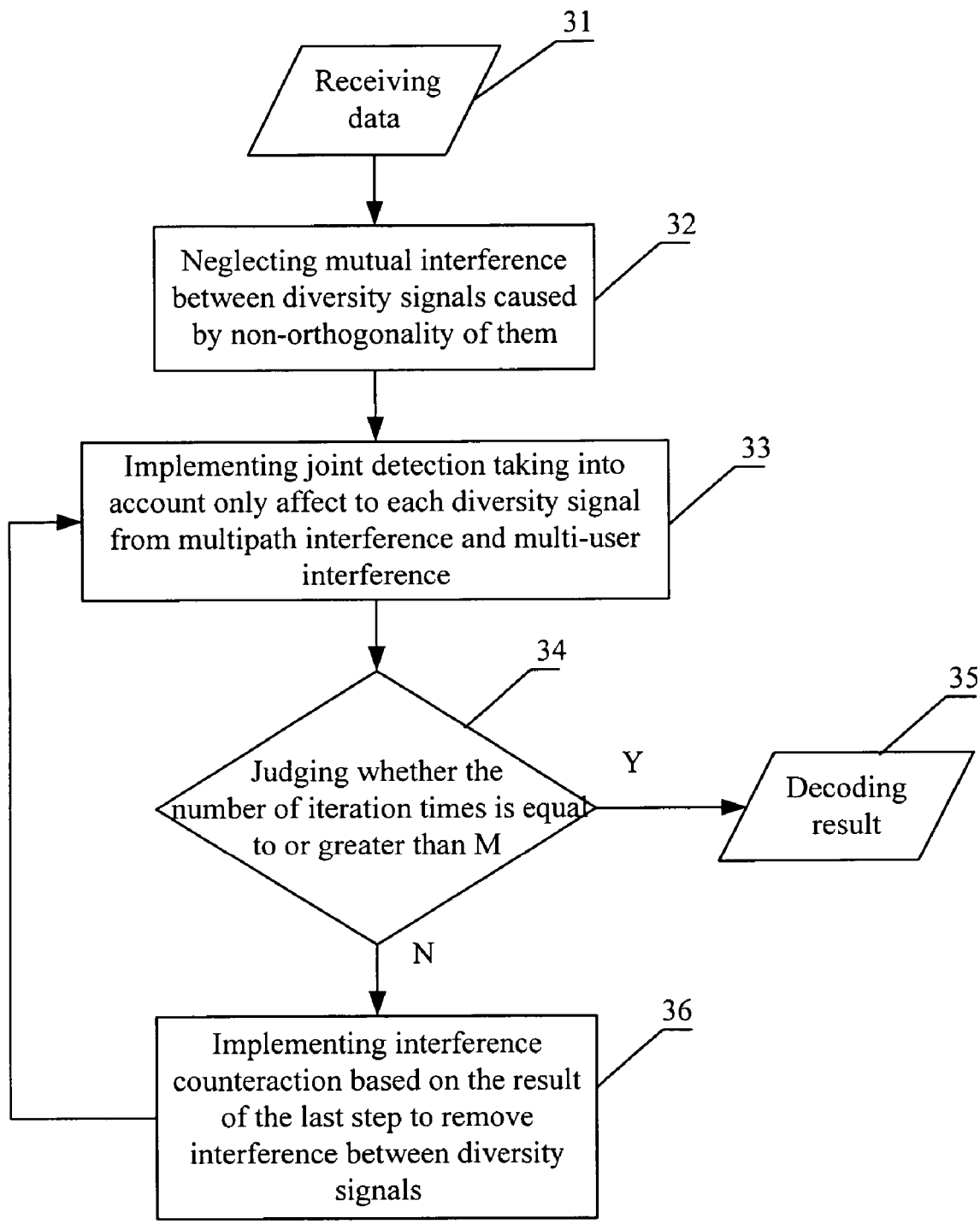
FIG. 3 is a flowchart illustrating the simplified decoding procedure of the invention.

FIG. 3 is a flowchart of the simplified decoding procedure of the invention.

Step 31, the terminal receives data.

Step 32, mutual interference between diversity signals caused by their non-orthogonality is neglected, upper right block and lower left block of formula (5) are set to be null (they are null under the condition of a flat fading channel).

Step 33, joint detection is performed, wherein only multi-path interference and multi-user interference to every diversity signal is taken account, in this case formula (6) is simplified to formula (8) shown in the following:

$$\begin{cases} \hat{d}(1) = B_S^{-1}(A_1^{*T}r_1 + (A_2^{*T}r_2)^*) \\ \hat{d}(2) = B_S^{-1}(A_1^{*T}r_2 - (A_2^{*T}r_1)^*) \end{cases} \quad (8)$$

Formula (8) gives the result of simplified joint detection. The matrix $B_S$ in formula (8) is given by formula (9):

$$B_S = \begin{cases} I & MF \\ A_1^{*T}A_1 + (A_2^{*T}A_2)^* & ZF-BLE \\ A_1^{*T}A_1 + (A_2^{*T}A_2)^* + \sigma^2 I & MMSE-BLE \end{cases} \quad (9)$$

Wherein $\sigma^2$ is the noise power, and I is the identity matrix. Calculating matrix $B_S$ also has three ways: match filter MF, zero-forcing block equalization ZF-BLE and minimum mean-square-error block equalization MMSE-BLE.

The dimension of matrix $B_S$ is NK×NK, so the calculation complexity of formula (8) is far less than that of formula (6) and is similar to that under the situation of no space-time encoding.

Step 34, whether the number of iteration times is equal to or greater than the predefined number M is judged. Usually M is set at 1 or 2.

Step 35, when the number of iteration times is equal to or greater than the predefined number M, the calculation result of formula (8) is outputted as the decoding result directly.

Step 36, when the number of iteration times is less than the predefined number M, the calculation result of formula (8) is used to implement interference counteraction so as to remove interference between diversity signals, that is, an interference counteraction method is used to counteract the remain interference between two diversity signals. This is done as follows:

Affect of d(1) is subtracted from the received data signal to obtain a 'clean' signal as shown in formula (10):

$$\begin{cases} r_1' = r_1 - A_1\hat{d}(1) \\ r_2' = r_2 - A_2 \hat{\phantom{d}}^*(1) \end{cases} \quad (10)$$

and affect of d(2) is subtracted from the received signal to obtain another 'clean' signal as shown in formula (11):

$$\begin{cases} r_1'' = r_1 + A_2\hat{d}^*(2) \\ r_2'' = r_2 - A_1\hat{d}(2) \end{cases} \quad (11)$$

Iteration operation is implemented. In detail, $r_1$ and $r_2$ in the second formula of formula (8) are respectively substituted with the result of the formula (10) $r_1'$ and $r_2'$; $r_1$ and $r_2$ in the first formula of formula (8) are respectively substituted with the result of the formula (11) $r_1''$ and $r_2''$; and then formula (8) is recalculated to obtain a decoding result after one iteration operation.

A second iteration operation can be done by taking last result $\hat{d}(1)$ and $\hat{d}(2)$ of formula (8) in formula (10) and formula (11). In other words, the obtained results of $r_1'$, $r_2'$, $r_1''$ and $r_2''$ are substituted to formula (8) again, and then formula (8) is recalculated to obtain a decoding result after the second iteration operation.

The iteration procedure can be done for M times, and this is the simplified joint detection algorithm.

Experience shows that usually only several iteration times, such as one to two times, are necessary to reach performance of the original joint detection algorithm. Therefore, the simplified joint detection algorithm according to this invention can obtain better performance with small amount of calculation complexity.

The invention proposes a space-time encoding and decoding method that takes independent data field as a processing unit for encoding input, and this is different with the prior method that takes data symbols or a string of symbols as a processing unit. With the proposed method, a simplified decoding method is designed to obtain a better performance with small amount of calculation complexity.

The invention provides a simple and effective solution for space-time encoding and decoding on a frequency selective fading channel.

The invention claimed is:

1. A space-time encoding and decoding method for a frequency selective fading channel, comprising:

A. taking, by an encoder, two independent data fields of a time slot in input data as a processing unit with space-time orthogonal encoding method, encoding them and generating two data vectors, thereby forming two diversity signals, and transmitting said two diversity signals simultaneously with each through a corresponding diversity antenna;

B. receiving, by a terminal, said two diversity signals, and neglecting mutual interference between said two diversity signals caused by non-orthogonality;

C. performing, by said terminal, joint detection that only takes into account the effect to said two diversity signals from multipath interference and multi-user interference, thereby obtaining a decoding result; and D. implementing interference cancellation based on a result of said joint detection to remove interference between said two diversity signals, and then returning to step C to implement iteration for decoding processing.

2. The method of claim 1, wherein said two diversity signals in step A are transmitted through two diversity beams of one smart antenna respectively and simultaneously.

3. The method of claim 1, further comprising the step of predefining number of iteration times to determine execution times from step C to step D and from step D to step C again.

4. The method of claim 1, wherein step B comprises: setting the upper right block and the lower left block of a matrix $$A^{*T}A = \begin{bmatrix} A_1^{*T}A_1 + (A_2^{*T}A_2)^* & (A_1^{*T}A_2)^T - A_1^{*T}A_2 \\ ((A_1^{*T}A_2)^T - A_1^{*T}A_2)^{*T} & (A_1^{*T}A_1 + (A_2^{*T}A_2)^*)^* \end{bmatrix}$$

to be null matrixes, and then calculating equation $\hat{d}_t(B)^{-1}A^{*T}r$ to obtain a simplified equation for joint detection; wherein $A_1$ and $A_2$ are system matrixes of signal transmission between first and second transmitting antennas and receiving antennas; A and B are matrixes; $\hat{d}_t$ is a value of continuous estimation of a receiving data field; r is a sample value of said receiving data field; T denotes a transpose operation; * denotes conjugate;

said joint detection in step C is calculated based on a simplified joint detection equation:

$$\begin{cases} \hat{d}(1) = B_S^{-1}(A_1^{*T}r_1 + (A_2^{*T}r_2)^*) \\ \hat{d}(2) = B_S^{-1}(A_1^{*T}r_2 - (A_2^{*T}r_1)^*) \end{cases},$$

wherein $\hat{d}(1)$ and $\hat{d}(2)$ are values of continuous estimation of two receiving data fields, $B_S$ is a matrix; $r_1$ and $r_2$ are sample values of two receiving data fields;

the step of implementing interference counteraction based on the result of said joint detection in step D further comprising:

D1. subtracting affect of a data field d(1) from received data signal based on the following formula, $$\begin{cases} r_1' = r_1 - A_1\hat{d}(1) \\ r_2' = r_2 - A_2\hat{d}^*(1) \end{cases}$$

thereby obtaining $r_1'$ and $r_2'$;
subtracting affect of another data field d(2) from received data signal based on the following formula:

$$\begin{cases} r_1'' = r_1 + A_2\hat{d}^*(2) \\ r_2'' = r_2 - A_1\hat{d}(2) \end{cases}$$

thereby obtaining $r_1''$ and $r_2''$;

D2. substituting $r_1'$ and $r_2'$ for $r_1$ and $r_2$ in the second equation of said simplified joint detection formula used in step C, and substituting $r_1''$ and $r_2''$ for $r_1$ and $r_2$ in the first equation of said simplified joint detection formula used in step C, calculating said simplified joint detection formula, thereby obtaining iteration results of $\hat{d}(1)$ and $\hat{d}(2)$.

5. The method of claim 4, wherein said matrix B is calculated by one of the following formulas:

$$B = \begin{cases} I \\ A^{*T}A \\ A^{*T}A + \sigma^2 I \end{cases}$$

these formulas including match filter scheme, zero-forcing block equalization scheme and minimum mean-square-error block equalization scheme; wherein $\sigma^2$ is noise power, and I is an identity matrix;

said matrix $B_S$ is calculated by one of the following formulas:

$$B_S = \begin{cases} I \\ A_1^{*T}A_1 + (A_2^{*T}A_2)^* \\ A_1^{*T}A_1 + (A_2^{*T}A_2)^* + \sigma^2 I \end{cases}$$

these formulas including match filter scheme, zero-forcing block equalization scheme and minimum mean-square-error block equalization scheme; wherein $\sigma^2$ is noise power, and I is an identity matrix.

6. The method of claim 4, wherein said system matrixes $A_1$ and $A_2$ are determined by channel pulse response and user transmission waveform.

7. The method of claim 1, wherein said neglecting mutual interference between said two diversity signals caused by non-orthogonality comprises:

setting, in a matrix $A^{*T}A$ which equals $$\begin{bmatrix} A_1^{*T}A_1 + (A_2^{*T}A_2)^* & (A_1^{*T}A_2)^T - A_1^{*T}A_2 \\ ((A_1^{*T}A_2)^T - A_1^{*T}A_2)^{*T} & (A_1^{*T}A_1 + (A_2^{*T}A_2)^*)^* \end{bmatrix},$$

the upper right block $(A_1^{*T}A_2)^T - A_1^{*T}A_2$ and the lower left block $((A_1^{*T}A_2)^T - A_1^{*T}A_2)^{*T}$ to null, wherein $$A = \begin{bmatrix} A_1 & -A_2 \\ A_2^* & A_1^* \end{bmatrix},$$

and $A_i$ is the system matrix of the signal transmission between the ith transmitting antenna and receiving antenna.

8. A space-time decoding method for a frequency selective fading channel, comprising:

A. receiving, by a terminal, two diversity signals, and neglecting mutual interference between said two diversity signals caused by non-orthogonality, wherein said two diversity signals are obtained by encoding two independent data fields of a time slot with space-time orthogonal encoding method and are transmitted simultaneously with each through a corresponding diversity antenna;

B. performing joint detection, by said terminal, neglecting mutual interference between said two diversity signals caused by non-orthogonality, thereby obtaining a decoding result; and C. implementing interference counteraction based on a result of said joint detection to remove interference between said two diversity signals, and then returning to step B to implement iteration for decoding processing.

9. The method of claim 8, further comprising:

predefining the number of iteration times for determining execution times from step B to step C and from step C to step B again.

10. The method of claim 8, wherein step A comprises: setting the upper right block and the lower left block of a matrix $$A^{*T}A = \begin{bmatrix} A_1^{*T}A_1 + (A_2^{*T}A_2)^* & (A_1^{*T}A_2)^T - A_1^{*T}A_2 \\ \left((A_1^{*T}A_2)^T - A_1^{*T}A_2\right)^{*T} & (A_1^{*T}A_1 + (A_2^{*T}A_2)^*)^* \end{bmatrix}$$

to be null matrixes, and then calculating equation $\hat{d}_t = (B)^{-1}A^{*T}r$ to obtain a simplified equation for joint detection; wherein $A_1$ and $A_2$ are system matrixes of signal transmission between first and second transmitting antennas and receiving antennas; A and B are matrixes; $\hat{d}_t$ is a value of continuous estimation of a receiving data field; r is a sample value of said receiving data field; T denotes a transpose operation; * denotes conjugate;

said joint detection in step F is calculated based on a simplified joint detection equation:

$$\begin{cases} \hat{d}(1) = B_S^{-1}(A_1^{*T}r_1 + (A_2^{*T}r_2)^*) \\ \hat{d}(2) = B_S^{-1}(A_1^{*T}r_2 - (A_2^{*T}r_1)^*) \end{cases},$$

wherein $\hat{d}(1)$ and $\hat{d}(2)$ are values of continuous estimation of two receiving data fields, $B_S$ is a matrix; $r_1$ and $r_2$ are sample values of two receiving data fields;

the step of implementing interference counteraction based on the result of said joint detection in step C further comprising:

C1. subtracting affect of a data field d(1) from received data signal based on the following formula, $$\begin{cases} r_1' = r_1 - A_1\hat{d}(1) \\ r_2' = r_2 - A_2\hat{d}^*(1) \end{cases}$$

thereby obtaining $r_1'$ and $r_2'$; subtracting affect of another data field d(2) from received data signal based on the following formula:

$$\begin{cases} r_1'' = r_1 + A_2\hat{d}^*(2) \\ r_2'' = r_2 - A_1\hat{d}(2) \end{cases}$$

thereby obtaining $r_1''$ and $r_2''$;

C2. substituting $r_1'$ and $r_2'$ for $r_1$ and $r_2$ in the second equation of said simplified joint detection formula used in step B, and substituting $r_1''$ and $r_2''$ for $r_1$ and $r_2$ in the first equation of said simplified joint detection formula used in step B, calculating said simplified joint detection formula, thereby obtaining iteration results of $\hat{d}(1)$ and $\hat{d}(2)$.

11. The method of claim 10, wherein said matrix B is calculated by one of the following formulas:

$$B = \begin{cases} I \\ A^{*T}A \\ A^{*T}A + \sigma^2 I \end{cases}$$

these formulas including match filter scheme, zero-forcing block equalization scheme and minimum mean-square-error block equalization scheme; wherein $\sigma^2$ is noise power, and I is an identity matrix;

said matrix $B_S$ is calculated by one of the following formulas:

$$B_S = \begin{cases} I \\ A_1^{*T}A_1 + (A_2^{*T}A_2)^* \\ A_1^{*T}A_1 + (A_2^{*T}A_2)^* + \sigma^2 I \end{cases}$$

these formulas including match filter scheme, zero-forcing block equalization scheme and minimum mean-square-error block equalization scheme; wherein $\sigma^2$ is noise power, and I is an identity matrix.

12. The method of claim 10, wherein said system matrixes $A_1$ and $A_2$ are determined by channel pulse response and user transmission waveform.

* * * * *